(12) United States Patent
Voigt et al.

(10) Patent No.: US 10,064,213 B2
(45) Date of Patent: Aug. 28, 2018

(54) METHOD AND NETWORK NODE FOR PRE-SCHEDULING GRANT TRANSMISSION

(71) Applicant: Telefonaktiebolaget LM Ericsson (publ), Stockholm (SE)

(72) Inventors: Lotta Voigt, Bromma (SE); Eric Andersson, Järfälla (SE); Vincent Huang, Sollentuna (SE); Mona Matti, Nacka (SE); Ying Sun, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 166 days.

(21) Appl. No.: 15/104,636

(22) PCT Filed: Dec. 16, 2013

(86) PCT No.: PCT/SE2013/051518
§ 371 (c)(1),
(2) Date: Jun. 15, 2016

(87) PCT Pub. No.: WO2015/094028
PCT Pub. Date: Jun. 25, 2015

(65) Prior Publication Data
US 2017/0019918 A1    Jan. 19, 2017

(51) Int. Cl.
*H04W 4/00* (2018.01)
*H04W 72/14* (2009.01)
*H04W 28/26* (2009.01)
*H04W 72/12* (2009.01)

(52) U.S. Cl.
CPC ........... *H04W 72/14* (2013.01); *H04W 28/26* (2013.01); *H04W 72/1289* (2013.01)

(58) Field of Classification Search
CPC .. H04W 72/14; H04W 28/26; H04W 72/1289
See application file for complete search history.

(56) References Cited

U.S. PATENT DOCUMENTS

2014/0295865 A1    10/2014    Fantaye et al.

FOREIGN PATENT DOCUMENTS

| WO | 03005762 A2 | 1/2003 |
|---|---|---|
| WO | 2010090566 A1 | 8/2010 |
| WO | 2011025426 A1 | 3/2011 |
| WO | 2011025427 A1 | 3/2011 |
| WO | 2011025434 A1 | 3/2011 |
| WO | 2013085441 A1 | 6/2013 |
| WO | 2014191050 A1 | 12/2014 |

*Primary Examiner* — Maharishi V Khirodhar
(74) *Attorney, Agent, or Firm* — Murphy, Bilak & Homiller, PLLC

(57) ABSTRACT

A pre-scheduling grant transmission method performed by a network node includes issuing a first sequence of pre-scheduling grants to provide a UE with reserved resources for uplink data packet transmission from a send buffer of the UE, collecting data relating to at least transmitted uplink traffic initiated by the first pre-scheduling grants to obtain a data set providing a statistical description of the traffic flow during the time period covered by the first sequence of pre-scheduling grants, predicting from the obtained data set the time when the next data packet arrives to the send buffer of the UE, and transmitting at least one pre-scheduling grant to the UE at a time in the vicinity of the predicted time, thereby providing the UE with timely resources for transmitting the data packet shortly after the packet has arrived at the UE send buffer.

29 Claims, 12 Drawing Sheets

METHOD AND NETWORK NODE FOR PRE-SCHEDULING GRANT TRANSMISSION

TECHNICAL FIELD

The proposed technology generally relates to a method for transmission of pre-scheduling grants. It also relates to a network node configured for performing the method. It also relates to a method for generating a pre-scheduling grant issuing sequence as well as a system for performing the method.

BACKGROUND

The MAC Scheduler in an eNodeB is responsible for dynamically scheduling the LTE air interface in both the downlink and uplink directions. This scheduling activity needs to accommodate the broad range of air interface features whilst simultaneously optimizing system capacity and delivering Quality of Service (QoS) to users. Within each uplink TTI, the eNodeB must evaluate which UEs require uplink resources, and if possible how much data each UE has/needs to send. Unlike in the downlink, this information is not directly available at the eNodeB. Instead, it is reported by UEs using one of the following:

Scheduling Request (SR) which informs the eNodeB that the UE has an unspecified amount of data to send.

Buffer Status Report (BSR) which informs the eNodeB that the amount of data the UE has to send is within a predefined range. The amount of data available is specified for logical channel groups rather than individual bearers.

Uplink grant pre-scheduling reserves resources for UE before a scheduling request (SR) is sent, thus it enables uplink packets to be sent faster than if a SR had to be sent.

Uplink prescheduling grants may waste system resources for those cases where the UE has nothing to send and answers a prescheduling grant with an empty BSR and a lot of padding. One example of a solution to solve this problem is to assign absolute low weight for the prescheduling UEs so that, in a higher load situation, the UEs with real traffic and higher weight can obtain the scheduling resources over prescheduling UEs. Thus, the resource wastage can be reduced in some critical situations. However, that also means the prescheduling is only applied in low load situation. In high or medium load situation, it is not possible to guarantee the QoS requirement of the expected QCI, Quality Class Identifier, of the prescheduling UEs. There is a prioritization problem between the prescheduling UEs and the UEs with real traffic or even other prescheduling UEs.

SUMMARY

It is an object to provide a mechanism that makes it possible for a network node to transmit pre-scheduling grants to a User Equipment based on the actual need of the User Equipment.

According to a first aspect there is provided a pre-scheduling grant transmission method performed by a network node. The method comprises the steps:

Issuing a first sequence of pre-scheduling grants on a downlink to a User Equipment, UE, providing the UE with reserved resources for uplink data packet transmission from a send buffer of the UE.

Collecting data relating to at least transmitted uplink traffic initiated by the transmitted first pre-scheduling grants in order to obtain a data set providing a statistical description of the traffic flow of at least uplink traffic during the time period covered by the first sequence of pre-scheduling grants.

Predicting based on at least a subset of the obtained data set, the time when the next data packet arrives to the send buffer of the UE.

And transmitting at least one pre-scheduling grant to the UE at a time in the vicinity of the predicted time when the next data packet arrives at the UE send buffer to thereby provide the UE with timely resources to enable the UE to transmit the data packet shortly after the packet has arrived at the UE send buffer.

The proposed method provides a way to collect data relating to a traffic flow and to predict, based on the collected data, how many pre-scheduling grants that should be transmitted and when to transmit the pre-scheduling grants.

According to a second aspect there is provided a network node configured for pre-scheduling grant transmission. The network node comprises Transmitting circuitry, configured to issue a first sequence of pre-scheduling grants on a downlink to a UE providing the UE with reserved resources for uplink data packet transmission from a send buffer of the UE.

Data collecting circuitry, configured to collect data relating to at least transmitted uplink traffic initiated by the transmitted first pre-scheduling grants in order to obtain a data set providing a statistical description of the traffic flow of at least uplink traffic during the time period covered by the first sequence of pre-scheduling grants.

A Prediction engine configured to predict, based on at least a subset of the obtained data set, the time when the next data packet arrives to the send buffer of the UE.

transmitting circuitry configured to transmit at least one pre-scheduling grant to the UE at a time in the vicinity of the predicted time when the next data packet arrives at the UE send buffer to thereby provide the UE with timely resources to enable the UE to transmit the data packet shortly after the packet has arrived at the UE send buffer.

Embodiments of the proposed technology makes it possible to predict an actual traffic flow in a network and to provide pre-scheduling grants to a User Equipment at times where it is deemed probable that a data packet has arrived at the send buffer of the UE. This provides for a time and resource saving mechanism that allows the UE to send its uplink data packet without having to transmit numerous Scheduling Requests. Other advantages will be appreciated when reading the detailed description.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
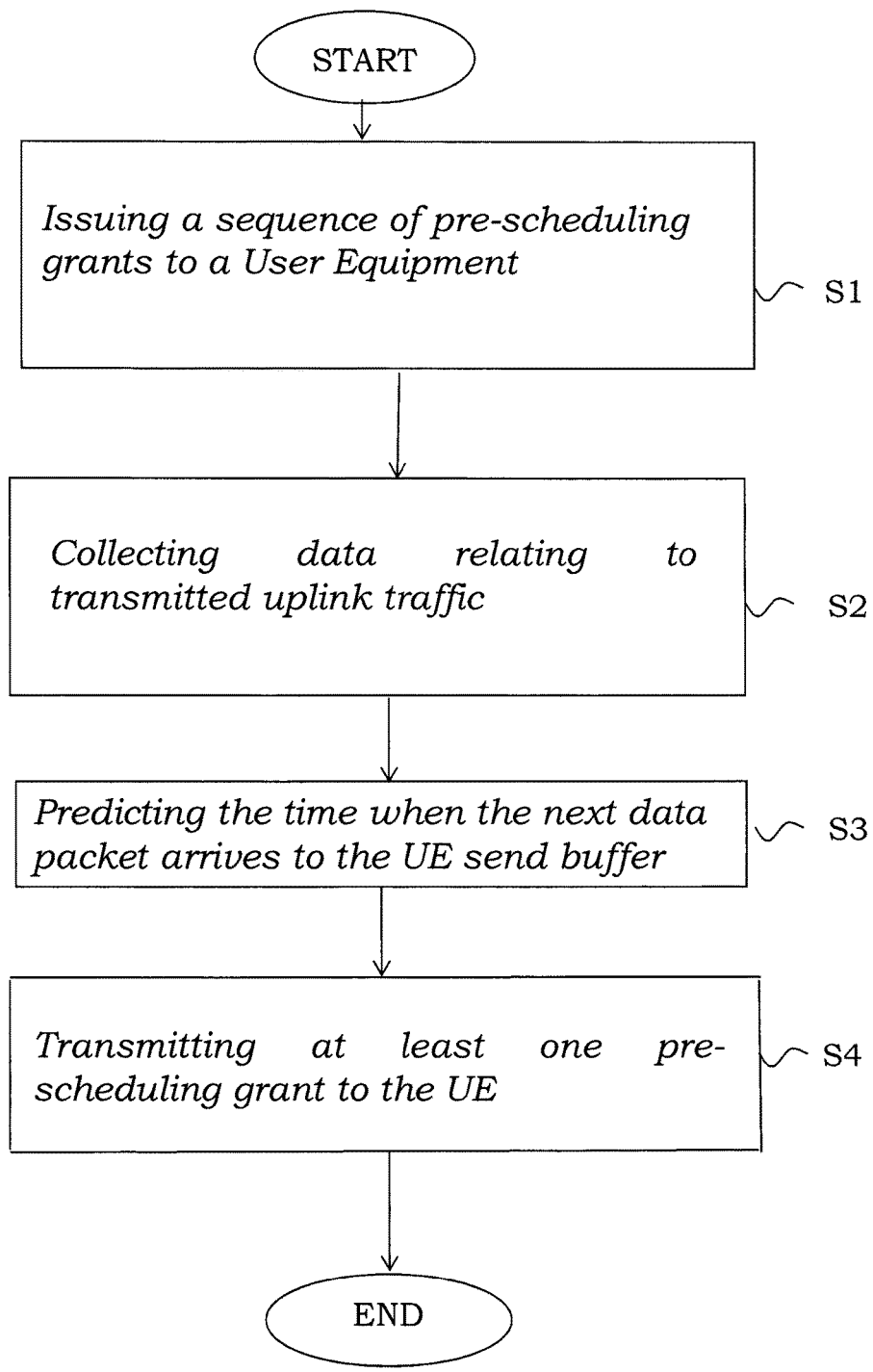
FIG. 1 is a schematic illustration of an embodiment of a method according to the proposed technology.

Throughout the drawings, the same reference numbers are used for similar or corresponding elements.

For a better understanding of the proposed technology, it may be useful to begin with a brief overview of grant transmission and scheduling request transmissions in a network such as an LTE network.

Data transmissions from a User Equipment to a serving node within a LTE network hinges on the fact that the serving node grants a right to transmit data to the UE. Therefore data packets in a send buffer of a UE can only be transmitted when such a grant has been received. Two general methods are used to control the transmissions. Firstly the UE can send Scheduling Requests, SRs, to the network node indicating that data is present in the send buffer and ready to be transmitted. The serving node will react to the SR by transmitting a grant to the UE and thus enable the UE to transmit the data packets in the send buffer. This is a rather time consuming way since multiple messages has to be transmitted between the UE and the serving node. To improve the method the serving node has been instructed to send prescheduling grants to the UE. These methods are sent according to certain patterns and are intended to provide grants to UE without the UE having to specifically ask for them. Thus, if a UE receives a prescheduling grant and have packets to transmit the UE will grab the prescheduling grant and transmit the packet to the serving node.

One problem inherent in the above described procedure is that there is no general way to design a sequence, according to which the prescheduling grants are to be transmitted, that satisfies the criteria of not wasting resources and at the same time provides timely prescheduling grants to the UE. With timely is here meant that the UE will be provided with a pre-scheduled grant that lies close to the arrival time of a data packet in the send buffer of the UE.

The serving node, i.e. an eNodeB, does not know the data packet arrival time at the UE send buffer. The arrival time of an uplink packet in the eNodeB will in general be delayed due to the earlier described procedure of transmitting scheduling requests and buffer status reports. When the UE wants to send uplink data it has to send a scheduling request or a buffer status report that is answered by the eNodeB by means of sending a scheduling grant that allows the UE to send its data. The UE is therefore only allowed to send scheduling requests at certain points in time, e.g. every 10 ms, which is the scheduling request periodicity. The buffer status reports are sent in conjunction with a previous uplink data transmission.

To be able to send timely pre-scheduling grants to the UE the predictions of when the next uplink data packet arrives at the send buffer has to be very accurate, on the level of milliseconds, and will therefore be strongly dependent on the correctness of the input data used to generate the prediction. The uncertainty in the input data caused by the scheduling process is therefore a problem.

When prescheduling a UE the latency of the uplink transmission is reduced. This may impact e.g. a TCP connection and the TCP protocol may ramp up and e.g. a web page may be downloaded at a higher rate, the time to down load the web page is reduced. This behavior is wanted and the gain in latency is the reason for pre-scheduling. But this also means that a successful prescheduling alters the traffic pattern and consequently makes it harder to make correct predictions.

According to the proposed technology, transmissions of pre-scheduling grants for uplink data packet traffic in for example LTE may be improved in respect to resource consumption by providing a mechanism for predictions of next packet arrival in the UEs send buffer. If such a mechanism were to be used, the sending sequence of pre-scheduling grants could be limited to those instances when uplink packets are predicted to arrive to the UEs send buffer.

The gain of such method will depend on the accuracy of the predictions. If the predictions are inaccurate this may result in a waste of resources or a limitation in the latency gain with pre-scheduling. If however the node could generate reliable input data the predictions could in turn be improved which would enable a more resource saving pre-scheduling grant transmission.

To be able to predict when a packet will arrive to the UE buffer it is therefore important that both the used prediction model and the input data are correct. That is, it is important that the input data that is used for the predictions are correct and also that the features that are used to build the prediction model will closely reflect the true time when the uplink packets arrive to the UE send buffer. The use of scheduling requests at specific time instances and buffer status reports to enable uplink transmissions also adds some uncertainty on when a packet actually reaches the UE buffer and is ready for transmission. The scheduling request periodicity impacts when a packet can be sent and so does the sending of buffer status reports. This uncertainty regarding the time when the packet actually reaches the UE send buffer also impacts any error correction process that can be used and, as a consequence, the prediction accuracy. This means that there is an uncertainty when a packet actually reaches the UE send buffer, it may have waited for some quite some time in the buffer before it is sent to the eNodeB.

The proposed technology provides a mechanism through which an improved prediction of the next data packet arrival can be obtained. This mechanism provides a means to obtain a reliable data set to be used by a prediction engine. The proposed technology furthermore make use the obtained input data to predict the arrival time of the next data packet at the UE send buffer and, based on the prediction, provides the UE with a timely pre-scheduling grant. The data packet might be interpreted as the amount of data that is transmitted within a specified time. For example the amount of data transmitted within one millisecond.

In other words, there is provided a pre-scheduling grant transmission method performed by a network node. The method is schematically illustrated in FIG. 1 and comprises the steps of:

Issuing S1 a first sequence of pre-scheduling grants on a downlink to a User Equipment, UE, providing the UE with reserved resources for uplink data packet transmission from a send buffer of the UE.

Collecting S2 data relating to at least transmitted uplink traffic initiated by the transmitted first pre-scheduling grants in order to obtain a data set providing a statistical description of the traffic flow of at least transmitted uplink traffic during the time period covered by the first sequence of pre-scheduling grants;

Predicting S3, based on at least a subset of the obtained data set, the time when the next data packet arrives to the send buffer of the UE, and Transmitting S4 at least one pre-scheduling grant to the UE at a time in the vicinity of the predicted time when the next data packet arrives at the UE send buffer to thereby provide the UE with timely resources to enable the UE to transmit the data packet shortly after the packet has arrived at the UE send buffer.

A specific advantage with the proposed method is that it provides a way to transmit pre-scheduling grants to the User Equipment at time points when it is most likely that the UE is in need of a grant. That is, when a UE has data packets to transmit. By providing the UE with a pre-scheduling grant at this particular time the UE might not need to specifically request a grant by means of issuing a scheduling request. Since it takes a relatively long time to obtain a grant by means of a scheduling request the method provides for an alternative way.

According to a particular embodiment of the method, the step S1 of issuing the first sequence of pre-scheduling grants will comprise transmitting pre-scheduling grants periodically with a period of at least one millisecond during the length of a specified time window.

By providing a large number of pre-scheduling grants in the first sequence will it be possible to collect data that provides a statistical description that accurately describes the traffic flow. This might be particularly useful in cases where the network node has very limited knowledge about the actual traffic flow.

In an exemplary embodiment of the proposed technology, the step S2 of collecting data could comprise collecting data relating to the receiving times at the network node for data packets transmitted on an uplink using the issued pre-scheduling grants. The data set would here comprise a representation of a statistical description of data packet receiving times at the network node.

In such an embodiment the collecting step could comprise receiving data packets and registering their receiving times. Since the number of received packets normally would be quite high the collected receiving times would constitute a particular representation of the data set.

In yet another exemplary embodiment the step S2 of collecting data might further comprise collecting data relating to the receiving times at the network node for scheduling requests transmitted from the UE on an uplink. The data set would here comprise a representation of a statistical description of receiving times of scheduling requests at the network node.

By incorporating data related to scheduling requests into the data set particular advantages are obtained. Since the scheduling requests provides an indication that the UE have data to transmit but have not been allowed to transmit it yet, the incorporation of the receiving times of scheduling request into the data set would add information about the traffic flow which would improve the statistical description of the traffic flow. Received scheduling requests can also be used to provide a measure of the accuracy of the predicted time arrival of the next data packet at the send buffer. This will be described in more detail at a later stage in the detailed description.

Figure 2:
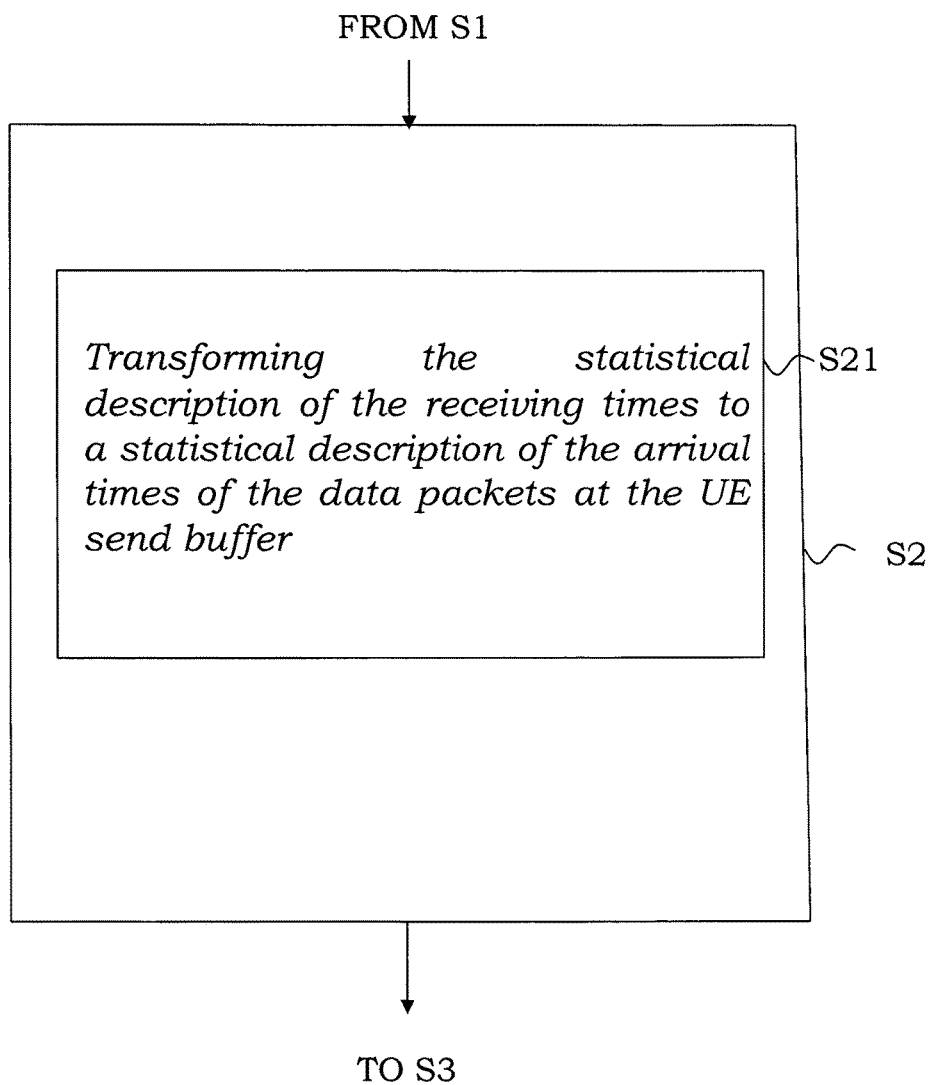
FIG. 2 is a schematic illustration of an exemplary embodiment of the method of FIG. 1.

FIG. 2 illustrates a particular example of an embodiment of the method. In this embodiment could the step S2 of collecting data comprise the step of transforming S21 the statistical description of the receiving times to a statistical description of the arrival times, associated to the receiving times, for the data packets at the UE send buffer by shifting the receiving times with specified time amounts, whereby the data set comprises a statistical description of the arrival times of data packets at the UE send buffer.

By transforming the statistical description of the receiving times to a statistical description of the arrival times at the UE send buffer for the associated data packets, the data set to be used in the prediction step would comprise a statistical description of the arrival times to the UE send buffer instead of the receiving times at the network node. This could be advantageous if the prediction method uses particular prediction models. It might in some scenarios be preferred to process a data set that comprises a statistical description of the arrival times of data packets at the UE send buffer. This step of transforming the receiving times to arrival times could be done for both the receiving times of data packets transmitted to the network node by using a pre-scheduling grant and the receiving times of scheduling requests transmitted from the UE to the network node.

To account for the first case, that is, where the receiving times relates to the receiving times of data packets transmitted to the network node by using a pre-scheduling grant the proposed method might perform the step S21 of transforming the statistical description, comprising the receiving times at the network node for data packets transmitted on an uplink using the issued pre-scheduling grants, by shifting the receiving times of the data packets with a time amount corresponding to the time the UE needs to process the pre-scheduling grant. This would in technology of the present day be approximately 4 milliseconds. Other time amounts might however be chosen depending on the circumstances where the method is used.

To account for the second case, that is, where the receiving times relates to the receiving times of scheduling requests, the method might perform the step S21 of transforming the statistical description comprising the receiving times at the network node for scheduling requests transmitted on an uplink by shifting the receiving times of the scheduling requests with a time amount corresponding to a time related to the length of the interval during which a UE is allowed to transmit a scheduling request.

Since the periodicity of a scheduling request, that is, the length of the interval during which a UE is allowed to transmit a single scheduling request in the present day standard is around 10 milliseconds the time shift could be related to this particular time interval. For example, half the interval, 5 milliseconds. Other possibilities do however exist such as the whole length of the interval or other fractions than half the interval. It is also here to let the specific time amount be determined by the actual circumstances during which the method is to be applied.

In a particular embodiment of the proposed technology the step S3 of predicting the time when the next data packet arrives to the send buffer of the UE is performed by a prediction engine provided with the data set.

Prediction engines are known in the art. Particular examples of such prediction engines are processing circuitry that comprises a processor and a memory. The memory comprise instructions that are executable by the processor. In a typical prediction engine the instructions could be computer programs that, when run on a computer performs the task of predictions. These computer programs could be programs that, when executed, obtain predictions from a set of data by using specified prediction models. Such models could for example be linear models such as Arima or Holt-Winters.

The prediction engine might however also use non-linear prediction models.

In an exemplary embodiment that might be useful in certain applications is the prediction engine provided with the data set a neural network adapted to find patterns within the obtained data set and use the patterns to predict an arrival time for the next data packet to the UE send buffer.

A neural network furnish a good example of a non-linear prediction model. Others models exists that could also be used in the prediction step S4 according to the proposed method. Random Forest or Wavelet Networks gives a couple of non-limiting examples.

In a particular useful exemplary embodiment of the proposed method the step S4 of transmitting the at least one pre-scheduling grant comprises transmitting a number of pre-scheduling grants distributed around the predicted time to thereby provide the UE with a set of pre-scheduling grants that allows the UE to pick a specific one of the transmitted pre-scheduling grants that is provided closest to the actual arrival time for the data packet at the send buffer.

By transmitting a number of pre-scheduling grants to arrive at the UE around the predicted arrival time of the data packet at the UE send buffer, the UE might be able to use one of the arrived pre-scheduling grants in case the predicted time arrival is not exact. That is, if a single pre-scheduling grant is transmitted to the UE so as to arrive at the predicted arrival time for a data packet at the send buffer of the UE, the predicted time might be slightly off and the UE might not be able to use the pre-scheduling grant. If however a number of pre-scheduling grants are distributed around the predicted time the UE might be able to pick one of these to transmit the data packet.

Since the method comprises step S2 of collecting data it will also collect data relating to this particular received data packet. By determining the actual arrival time and comparing with the predicted time the method might also generate an error estimation for the prediction.

In a particular embodiment of the proposed method could the number of pre-scheduling grants transmitted around the predicted arrival time be determined based on the number of received scheduling requests.

In other words, the number of pre-scheduling grants transmitted around the predicted arrival time might be based on data collected about the number of received scheduling requests. Since the number of received scheduling requests provides an indication of the level of inexactness of the prediction one might base the number of transmitted pre-scheduling grant on the number of collected scheduling requests.

In a particular embodiment of the method could the number of pre-scheduling grants be determined based on threshold values, an upper threshold value, indicating that a specified higher number of pre-scheduling grants are to be transmitted, and a lower threshold value indicating that specified lower number of pre-scheduling grants are to be transmitted.

In general the mentioned threshold values would be decided by taking into account optimal prediction accuracy and system load.

In still another embodiment the proposed method might determine the number of pre-scheduling grants transmitted around the predicted arrival time based on an error estimation for the prediction. Since the method comprises a step S2 of collecting data it will also collect data relating to the data packet that were received using one of the number of pre-scheduling grants transmitted around the predicted arrival time. By determining the actual arrival time, using the collected data, and comparing with the predicted time the method might also generate an error estimation for the prediction. If this error is large the number of pre-scheduling grants transmitted around the predicted arrival time should be large while a smaller error indicates that a smaller number could be transmitted.

According to a particular embodiment of the proposed method the steps (S1)-(S4) might be repeated using the at least one transmitted pre-scheduling grant in place of the issued first sequence of pre-scheduling grants to dynamically improve the obtained data set and enable the network node to collect more data to incorporate into the data set used for the prediction.

The repetition of the method using the latest transmitted pre-scheduling grants instead of the first sequence of pre-scheduling grants in the step S1 provides for a way to update the data set obtained in the collecting step S2. Since the data set is updated the prediction engine will be provided with a data set that enables it to make better predictions.

This repetition might in principle be performed any number of times incorporating more and more updated data thus providing an updated data set that provides excellent input data for a prediction engine.

In all the embodiments described above the method could be performed by a network node that is a radio base station.

To facilitate the understanding about the concepts underlying the proposed technology a number of specific examples will be given. These examples are only illustrative and to obtain as much clarity as possible extremely schematic and simplified examples are given. The features of these clarifying examples should not be interpreted in any way as providing limitations to the proposed technology, which, on the contrary can handle vastly more complicated scenarios.

Figure 3A:
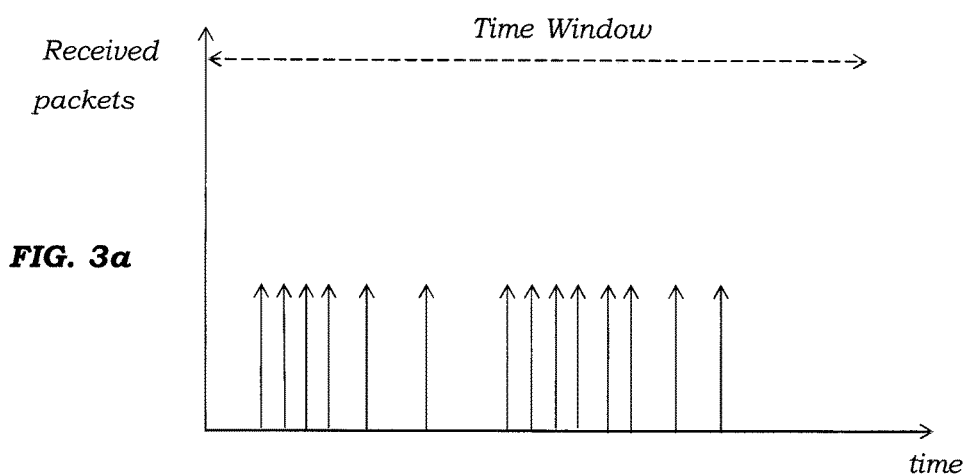
FIG. 3a illustrates schematically a traffic flow during a time window.
Figure 3B:
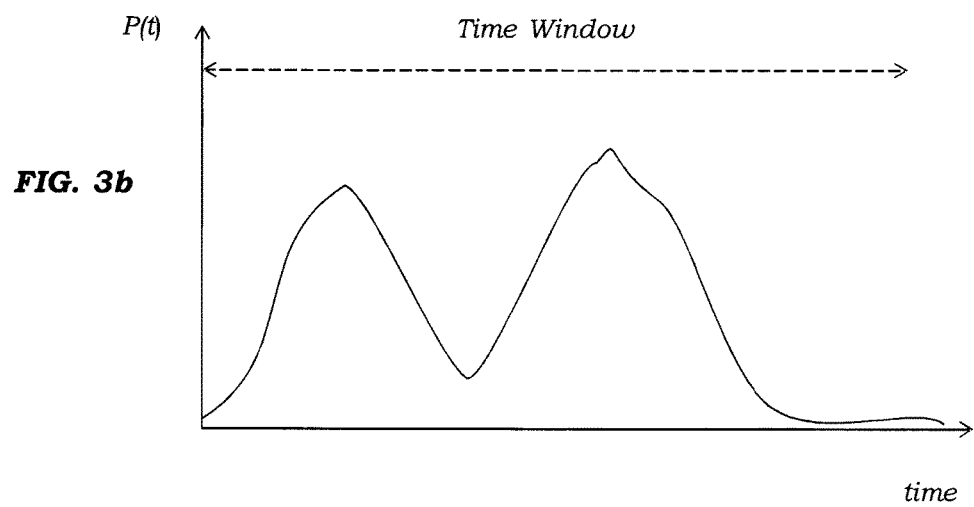
FIG. 3b illustrates an example of a statistical description of the traffic flow during a time window

Before proceeding with a first example of a simplified application of the proposed technology reference is made to FIG. 3a. FIG. 3a illustrates schematically how a network node receives, from a UE, a number of data packets. A data packet might be interpreted as the amount of data that is transmitted within a specified time. For example, the amount of data transmitted within one millisecond. Other times could equally well be used. The up-pointing arrows indicate the transmission of data packets from the UE. In FIG. 3b there is provided a schematic graph illustrating statistical description of the traffic flow in FIG. 3a. The graph is provided in the form of a time dependent frequency distribution of the receiving times of data packets at the network node. The term traffic flow will in this particular example relate to the traffic flow to and from one UE.

Figure 4A:
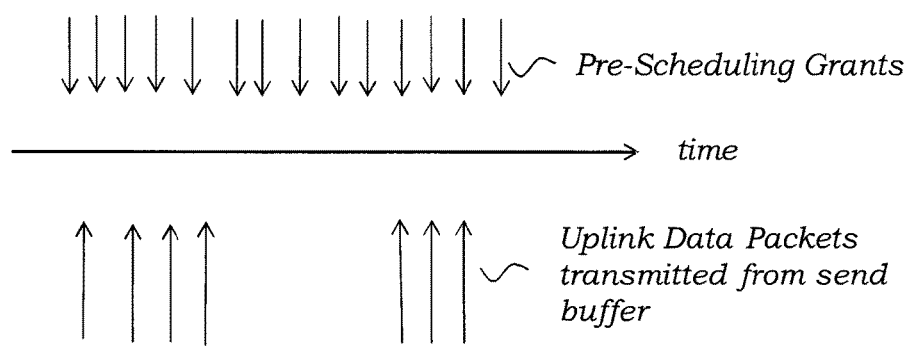
FIG. 4a is a schematic illustration exemplifying certain features of the proposed technology

FIG. 4a illustrates how a sequence of pre-scheduling grants are issued, i.e. transmitted, in a step S1 on a downlink from a Network Node, i.e. an eNodeB, to a User Equipment served by the eNodeB. The arrows pointing downward illustrates pre-scheduling grants transmitted on the downlink to the UE while arrows pointing upwards illustrates data transmitted from the UE to the network node on the uplink.

The pre-scheduling grants are in this example issued according to a first sequence that is a dense sequence. With a dense sequence is intended a sequence where as many pre-scheduling grants as possible are transmitted. In current praxis this would amount to sending pre-scheduling grants periodically with a period of 1 millisecond. A particular purpose of using a dense sequence of pre-scheduling grants is the ability to obtain a data set comprising information about the traffic flow even for those cases where one lacks any beforehand knowledge about the traffic flow. The length of the issuing sequence might vary. For some particular scenarios it might be a good idea to use a long time window, for example a one day long time window, to thereby obtain as much data as possible about the actual traffic. In other scenarios it might however be possible to use significantly shorter time windows, all the way down to the order of sub-seconds.

The issued pre-scheduling grants provides the UE with an indication that resources have been reserved for the UE to transmit uplink data to the network node. Since the sequence of pre-scheduling grants are dense in this example, the UE will be provided with ample opportunities to transmit data packets arriving at the send buffer more or less at once.

When the UE has transmitted a data packet, the network node will, in this particular example, collect, in a step S2, data by means of receiving the data packet and register the corresponding receiving time. By continuously performing the data collecting step during the duration of sequence of issued pre-scheduling grants the network node will obtain a data set that provides a statistical description of the actual traffic flow in the time window. The collected data set could for example comprise information relating to uplink transmissions, such as receiving times of data packets and scheduling requests. The data might also however also comprise information relating to downlink transmissions, such as transmission times of pre-scheduling grants and grants transmitted as a response to scheduling requests. The amount of data that might be collected and used can be determined by the actual application of the proposed method.

It is possible to transform, in a step S21, the data set from the above given representation providing data related to the receiving times to a data set providing data related to the arrival time of data packets at the UE send buffer. One particular way to obtain this is to shift the value of all registered receiving times with a specified time amount corresponding to the time the UE needs to process the pre-scheduling grant. This time amount lies around 4 milliseconds in the current technology.

Regardless of which data set is used, the obtained data set will provide the input for the step S3 of predicting the time arrival of the next data packet at the UE send buffer. In a particular case is it possible that this prediction is performed by a prediction engine such as a neural network that has been trained to find patterns in data sets such as the collected data set.

Figure 4B:
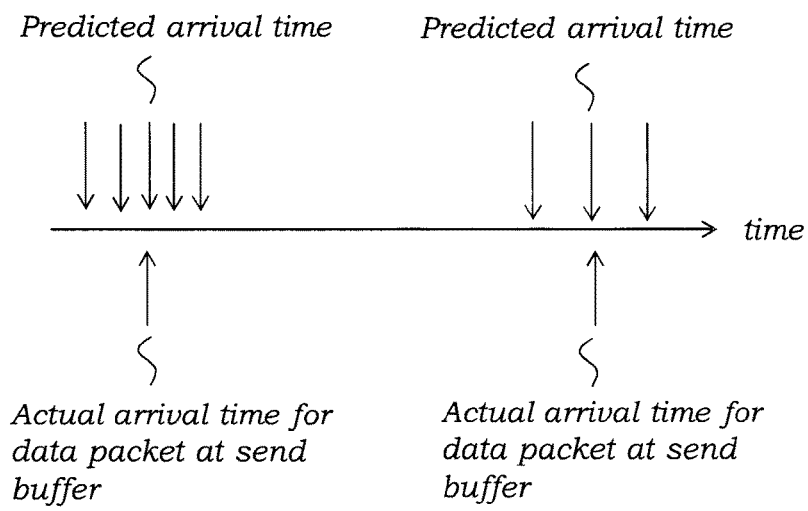
FIG. 4B is another schematic illustration exemplifying certain features of the proposed technology statistical description of the traffic flow
Figure 6:
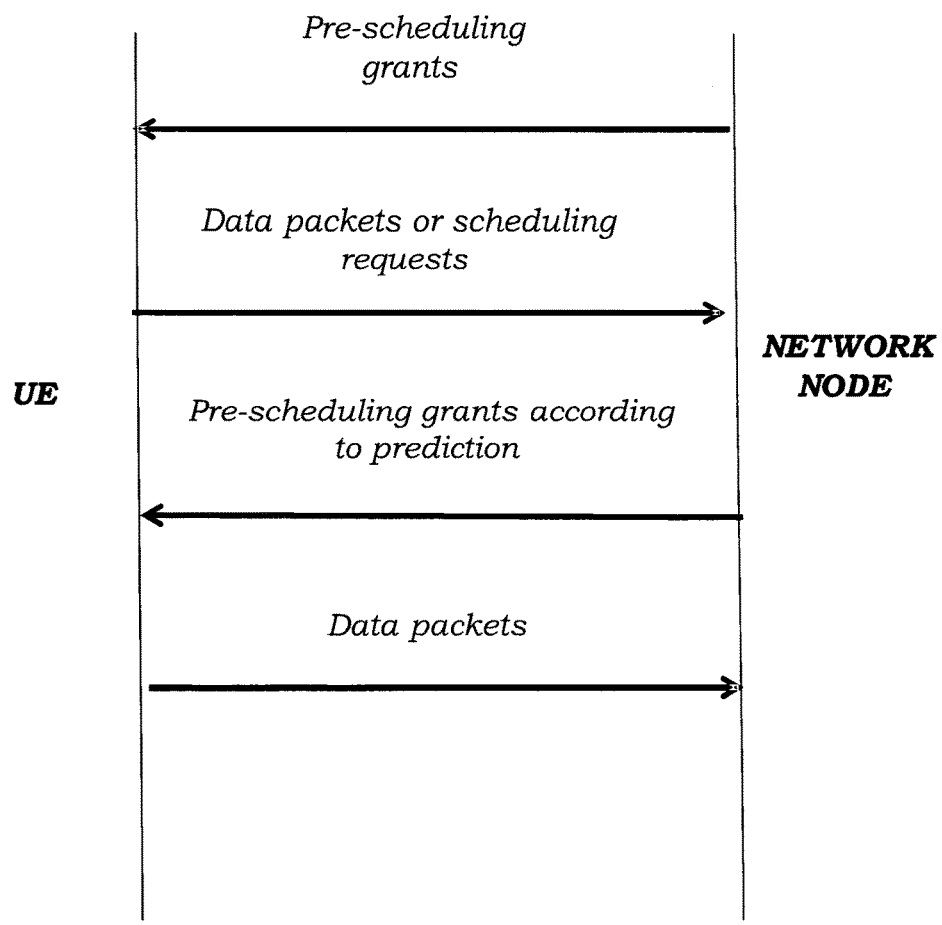
FIG. 6 is a signal diagram illustrating, schematically, an exemplary embodiment of the proposed technology.

After having predicted the arrival time for the next data packet to arrive at the send buffer of the UE in the step S3, the method will proceed and transmit at least one pre-scheduling grant that will arrive at the UE in the vicinity of the predicted arrival time. It is possible to transmit a single pre-scheduling grant, in particular cases it might however be preferred to transmit a number of pre-scheduling grants distributed around the predicted arrival time. This is schematically illustrated in FIG. 4b, or in an alternative way in the signaling diagram of FIG. 6. If the prediction is satisfactory the UE will be provided with a timely pre-scheduling grant that allows it to transmit the arrived data packet on an uplink to the eNodeB.

At this point the method might restart at the step S2 of collecting data relating to the traffic flow initiated by the transmitted pre-scheduling grant(s). That is, the method as described above will be repeated using, in step S1, instead of the first sequence of pre-scheduling grants the pre-scheduling grant or the pre-scheduling grants transmitted at the predicted arrival time. By repeating the method it will be possible to dynamically improve the data set used for the prediction. As a specific example, assume that three pre-scheduling grants were transmitted to the UE so as to arrive around an estimated arrival time t. Assume further that one pre-scheduling grant were provided exactly at the predicted arrival time and the other two were provided at time points shifted from the predicted arrival time, one provided a certain time before the predicted time and one a certain after the predicted time. If now the data packet actually arrived at the UE send buffer at a time before the predicted arrival time, the UE will in this case grab the earlier pre-scheduling grant to transmit the uplink data packet. By collecting data, or equivalently, statistics corresponding to the data packet the data set will be updated and one is also provided with a measure of the error of the earlier prediction. The error and the updated data set could now be provided to the prediction engine for either training purposes or as input for a subsequent prediction of the arrival time for data packets at the UE send buffer. In this way the proposed technology provides a mechanism that allows for a dynamically generated update of the data set used for prediction.

A second simplified example of an application of the method relates to a particular case where the first sequence of pre-scheduled grants issued in step S1 contains a lower number of pre-scheduling grants. This could for example be the case when the method have been restarted at the step S2 of collecting data when the pre-scheduling grant or the pre-scheduling grants transmitted at the predicted arrival time has been used in step S1 instead of the first sequence of pre-scheduling grants. It could also relate to an application where the first sequence is chosen to contain fewer pre-scheduling grants. For example due to limitations in resources.

Figure 5:
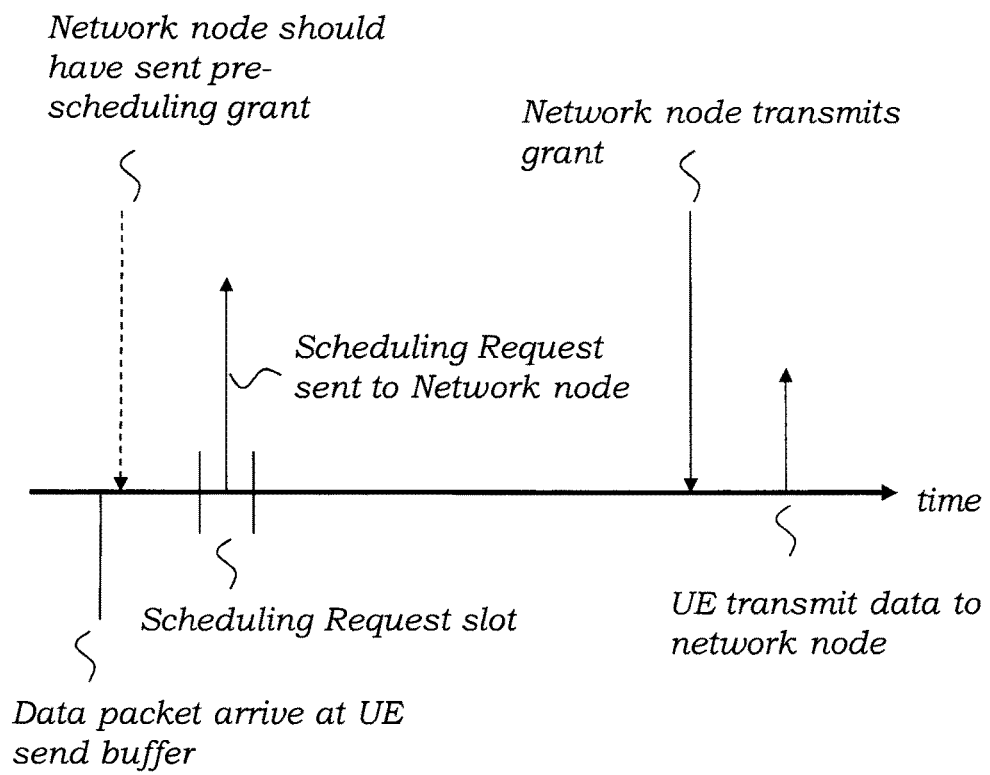
FIG. 5 is an illustration providing an example of a situation where a scheduling requests is transmitted

In this application the arrivals of pre-scheduling grants at the UE are sparser. It is therefore possible that a data packet arrives at the UE at times when no pre-scheduling grant can be used. As in the normal procedures for such cases the UE will transmit a scheduling request to the network node. This is illustrated in FIG. 5. Since the accuracy of the predictions depend upon the data set that provides the statistical description of the actual traffic flow it would be advantageous to be able to incorporate data relating to data packet arrivals at the UE send buffer also for those cases when no pre-scheduling grant is provided to the UE. According to the proposed technology this is obtained by means of incorporating data relating to the received scheduling request in the data set. This could in a simple example be accomplished by interpreting the received scheduling request as a received data packet transmitted with the help of a pre-scheduling grant. The difference between the receiving times of data packets transmitted, as allowed by a pre-scheduling grant, and the receiving times of scheduling grants is apparent when one aims to transform the data set from a data set representing receiving times to a data set representing arrival times of data packets at the UE send buffer. The proposed technology handles this by choosing different time shifts for the different receiving times, that is, the receiving time of a data packet is shifted by a first amount and the receiving time of the scheduling request is shifted by a second amount. Possible values of first time amount was described above while the second time could be chosen so as to take into consideration the periodicity of a scheduling request. That is, the UE is only allowed to transmit one scheduling request per period. The current value of this period is about 10 milliseconds. So one could, for example, chose a time value that lies in the interval 0 to 10milliseconds. Other time amounts are however possible.

By incorporating also scheduling requests in the data set to be used for the prediction the input data has been improved dynamically without having to provide such data in a separate step. This provides for an efficient way to obtain as good input data as possible.

The proposed technology also relates to a network node that is configured for pre-scheduling grant transmission. In what follows exemplary embodiments of such a network node will be given.

Figure 7:
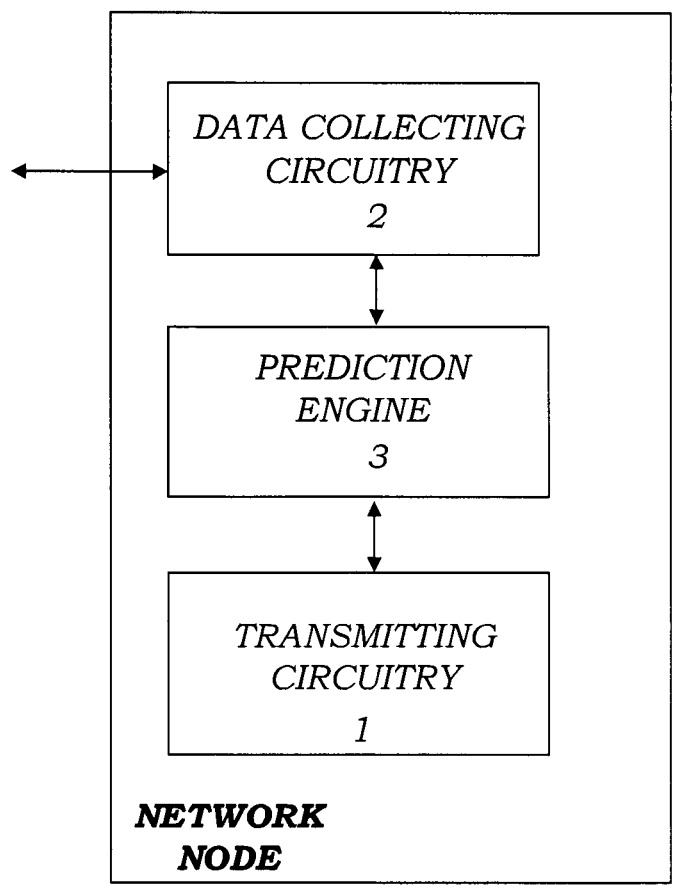
FIG. 7 is a schematic block diagram showing an example of an embodiment of a network node according to the proposed technology

In FIG. 7 there is schematically illustrated a particular exemplary embodiment of a network node configured for pre-scheduling grant transmission. The network node comprises:

Transmitting circuitry 1, configured to issue a first sequence of pre-scheduling grants on a downlink to a UE providing the UE with reserved resources for uplink data packet transmission from a send buffer of the UE.

Data collecting circuitry 2, configured to collect data relating to at least transmitted uplink traffic initiated by the transmitted first pre-scheduling grants in order to obtain a data set providing a statistical description of the traffic flow of at least transmitted uplink traffic during the time period covered by the first sequence of pre-scheduling grants.

Prediction engine 3 configured to predict, based on at least a subset of the obtained data set, the time when the next data packet arrives to the send buffer of the UE.

Transmitting circuitry 1 that is configured to transmit at least one pre-scheduling grant to the UE at a time in the vicinity of the predicted time when the next data packet arrives at the UE send buffer to thereby provide the UE with timely resources to enable the UE to transmit the data packet shortly after the packet has arrived at the UE send buffer.

The transmitting circuitry 1 might comprise a single transmitter configured to both issue the first sequence of pre-scheduling grants and transmit the at least one pre-scheduling grant. There might however be more than one transmitter, where one transmitter is configured to issue the first sequence of pre-scheduling grants and a second transmitter configured to transmit the at least one pre-scheduling grant.

In another exemplary embodiment of a network node configured for pre-scheduling grant transmission is the transmitting circuitry 1 configured to issue a first sequence of pre-scheduling grants where the pre-scheduling grants are transmitted periodically with a period of at least one millisecond during the length of a specified time window.

In still another embodiment of a network node is the data collecting circuitry 2 configured to collect data relating to the receiving times at the network node for data packets transmitted on an uplink using the issued pre-scheduling grants wherein the data set comprises a representation of a statistical description of data packet receiving times at the network node.

Figure 8:
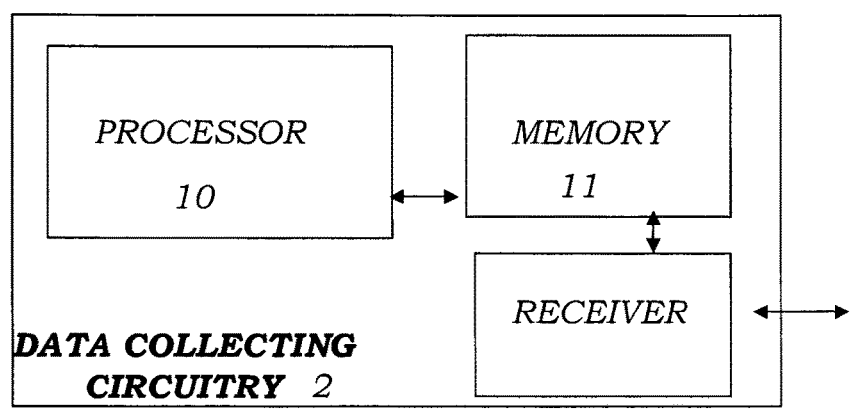
FIG. 8 is a schematic block diagram illustrating the data collecting circuitry according to an example of an embodiment of the proposed network node.

FIG. 8 illustrates schematically a possible data collecting circuitry comprising a processor 10, a memory 11 and a receiver.

In yet another embodiment of a network node, the data collecting circuitry 2 is further configured to collect data relating to the receiving times at the network node for scheduling requests transmitted from the UE on an uplink wherein the data set comprises a representation of a statistical description of receiving times of scheduling requests at the network node.

In a version of the earlier embodiments of the network node is the data collecting circuitry 2 also configured to transform the statistical description of the receiving times at the network node to a statistical description of the arrival times, associated to the receiving times, at the UE send buffer by shifting the receiving times with specified time amounts, whereby the data set comprises a statistical description of the arrival times at the UE send buffer.

In yet another version of a network node according to the earlier described embodiments is the data collecting circuitry 2 configured to transform the statistical description comprising the receiving times at the network node for data packets transmitted on an uplink using the issued pre-scheduling grants by shifting the receiving times of the data packets with a time amount corresponding to the time that the UE needs to process the pre-scheduling grant.

In a useful version of the earlier described embodiments of a network node is the data collecting circuitry 2 configured to transform the data set comprising the receiving times at the network node for scheduling requests transmitted on an uplink by shifting the receiving times of the scheduling requests with a time amount corresponding to a time related to the length of the interval during which a UE is allowed to transmit a scheduling request.

In a particular embodiment of a network node, relevant for all earlier described embodiments, is the prediction engine 3 configured to predict the time when the next data packet arrives to the send buffer of the UE based on the obtained data set.

Figure 9:
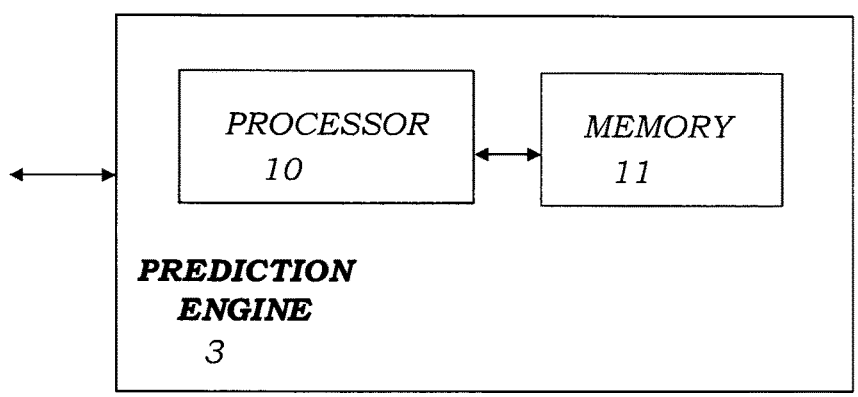
FIG. 9 is a schematic block diagram illustrating the data prediction engine according to an example of an embodiment of the proposed network node.

FIG. 9 illustrates schematically a possible embodiment of such a prediction engine 3. In this embodiment the prediction engine 3 comprise a processor 10 and a memory 11.

Figure 10:
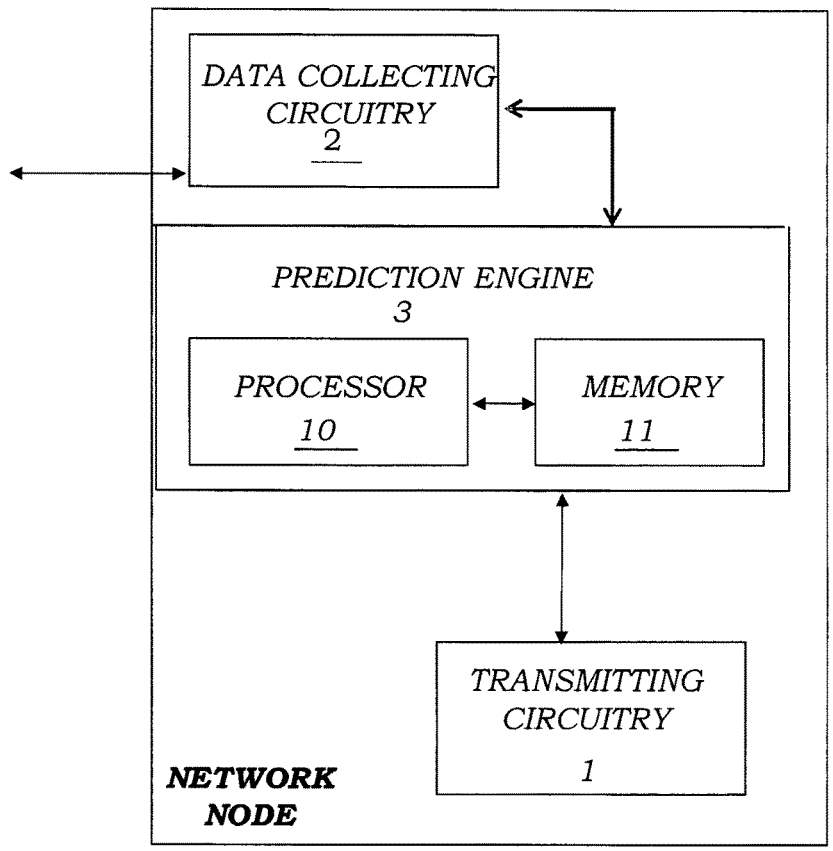
FIG. 10 is a schematic block diagram showing an example of the proposed network node according to a particular embodiment of the proposed technology.

FIG. 10 illustrates schematically a possible embodiment of a network node comprising the prediction engine 3 illustrated in FIG. 9.

Figure 11:
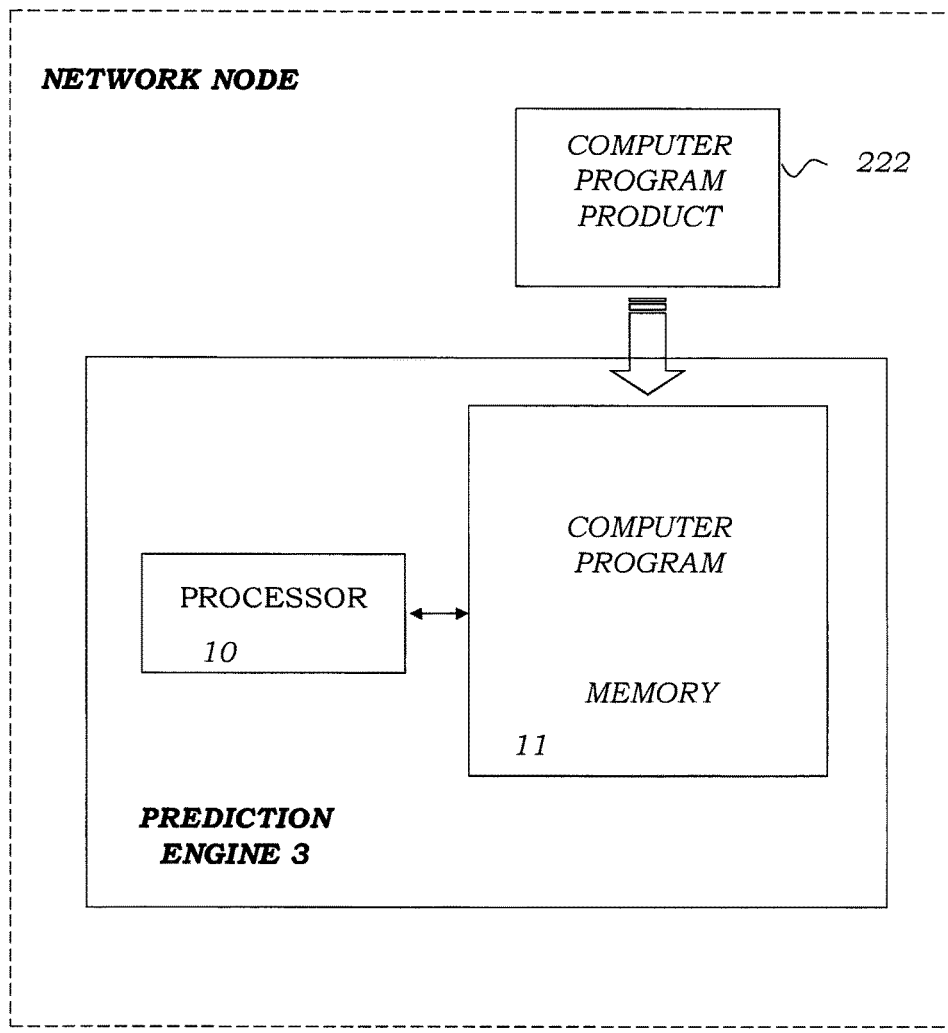
FIG. 11 illustrates schematically an alternative embodiment of the prediction engine according to an example of an embodiment of the proposed network node.

FIG. 11 illustrates schematically a specific embodiment of a network node with a prediction engine where the prediction engine comprises a memory 11, a processor 10 and a computer program product 222.

By way of example, in an embodiment of a network node is the prediction engine provided with the obtained data set a neural network adapted to find patterns within the obtained data set and use the patterns to predict an arrival time for the next data packet to the UE send buffer.

In a particularly useful exemplary embodiment of a network node is the transmitting circuitry configured to transmit a number of pre-scheduling grants distributed around the predicted time to thereby provide the UE with a set of pre-scheduling grants that allows the UE to pick a specific one of the transmitted pre-scheduling grants that is provided closest to the actual arrival time for the data packet at the send buffer.

In a version of the exemplary embodiment of the network node given above is the transmitting circuitry configured to transmit a number of pre-scheduling grants around the predicted arrival time, where the number is determined based on the number of received scheduling requests.

In still another exemplary embodiment of a network node is the number of pre-scheduling grants to be transmitted determined based on threshold values, an upper threshold value, specifying that a specified higher number of pre-scheduling grants are to be transmitted, and a lower threshold value specifying that specified lower number of pre-scheduling grants are to be transmitted.

In an exemplary embodiment of a network node relevant for all earlier described embodiments are the transmitting circuitry 1, the data collecting circuitry 2 and the prediction engine 3 configured to repeat their respective tasks using the at least one transmitted pre-scheduling grant in place of the issued first sequence of pre-scheduling grants to dynamically improve the obtained data set and enable the network node to collect more data to incorporate into the data set used for the prediction.

In all the described embodiments could the network node be a radio base station.

Figure 12:
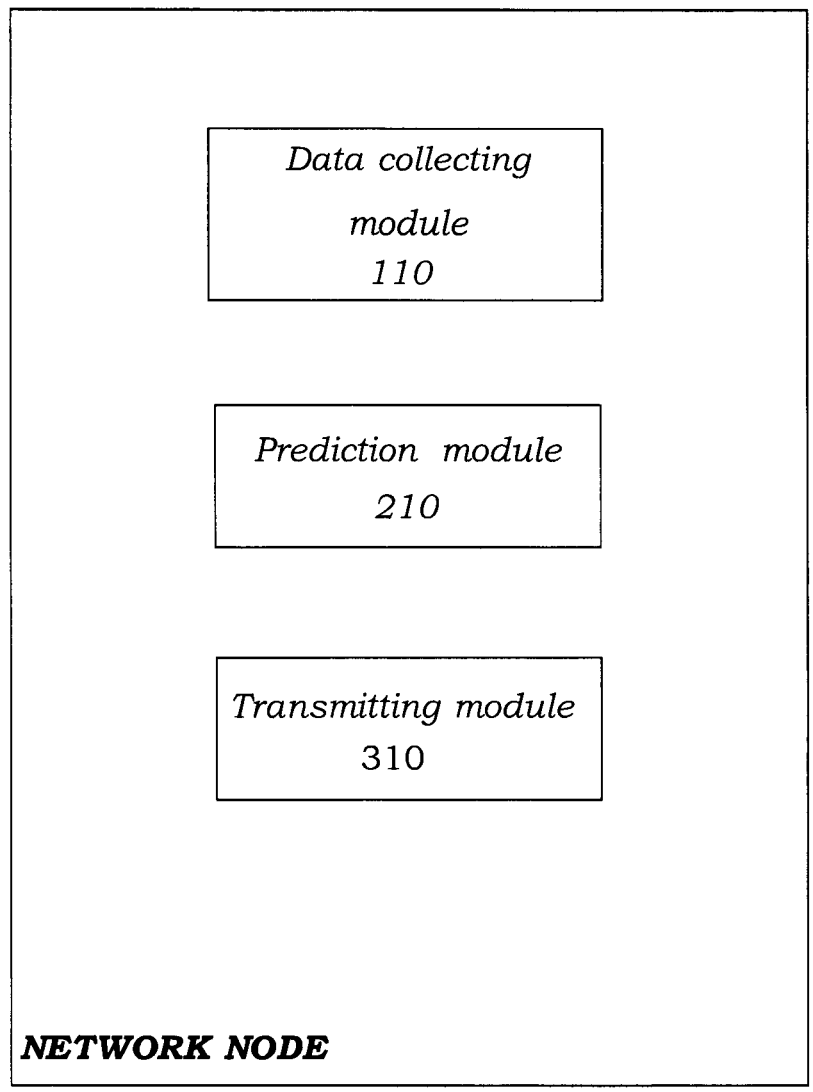
FIG. 12 is a schematic illustration of an exemplary embodiment of a function module grouping of a network node according to the proposed technology.

The described network node may alternatively be defined as a group of function modules, where the function modules are implemented as a computer program running on a processor. FIG. 12 is a schematic block diagram illustrating an example of a network node configured for transmitting pre-scheduling grants. The network node comprises:

- a transmitting module 310 configured to issue a first sequence of pre-scheduling grants on a downlink to a UE providing the UE with reserved resources for uplink data packet transmission from a send buffer of the UE.
- a data collecting module 110 configured to collect data relating to at least transmitted uplink traffic initiated by the transmitted first pre-scheduling grants in order to obtain a data set providing a statistical description of the traffic flow of uplink and downlink traffic during the time period covered by the first sequence of pre-scheduling grants.
- a prediction module 210 configured to predict, based on at least a subset of the obtained data set, the time when the next data packet arrives to the send buffer of the UE.
- a transmitting module 310 is also configured to transmit at least one pre-scheduling grant to the UE at a time in the vicinity of the predicted time when the next data packet arrives at the UE send buffer to thereby provide the UE with timely resources to enable the UE to transmit the data packet shortly after the packet has arrived at the UE send buffer.

The functionalities of the transmitting modules of the network node might be performed by the same transmitting module, they could however also be separate transmitting modules performing their respective tasks.

As used herein, the term "User Equipment", UE, should be interpreted as a non-limiting term comprising any device equipped with radio circuitry for wireless communication according to any relevant communication standard.

As used herein, the term "network node" may refer to base stations, network control nodes, and the like. In particular, the term "base station" may encompass different types of radio base stations including standardized base stations such as Node Bs, or evolved Node Bs, eNodeBs, and also macro/micro/pico radio base stations, home base stations, also known as femto base stations, relay nodes, repeaters, radio access points, and even radio control nodes controlling one or more Remote Radio Units, RRUs, or the like.

The UE and the network node disclosed may also include radio circuitry for communication with one or more other nodes, including transmitting and/or receiving information.

It will be appreciated that the methods and devices described above can be combined and re-arranged in a variety of ways.

For example, embodiments may be implemented in hardware, or in software for execution by suitable processing circuitry, or a combination thereof. The steps, functions, procedures, modules and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described above may be implemented in software such as a computer program for execution by suitable processing circuitry including one or more processing units.

The flow diagram or diagrams presented may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

The network node as described could comprise processing circuitry such as one or more processors and a memory. At least some of the steps, functions, procedures, modules and/or blocks described above could be implemented in a computer program, which is loaded into the memory for execution by the processing circuitry. The processing circuitry and memory are interconnected to each other to enable normal software execution. An optional input/output device may also be interconnected to the processing circuitry and/or the memory to enable input and/or output of relevant data such as input parameter(s) and/or resulting output parameter(s).

The term 'computer' above should be interpreted in a general sense as any system or device capable of executing program code or computer program instructions to perform a particular processing, determining or computing task.

The software or computer program may be realized as a computer program product, which is normally carried or stored on a computer-readable medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Universal Serial Bus, USB, memory, a Hard Disk Drive, HDD storage device, a flash memory, or any other conventional memory device. The computer program may thus be loaded into the operating memory of a computer or equivalent processing device for execution by the processing circuitry thereof.

The network node or the system is thus configured to perform, when executing the computer program, well-defined processing tasks such as those described above.

The computer or processing circuitry does not have to be dedicated to only execute the above-described steps, functions, procedure and/or blocks, but may also execute other tasks.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

QoS Quality of Service
UE User Equipment
LTE Long Term Evolution
TTI Transmission Time Interval
SR Scheduling Request
BSR Buffer Status Report
QCI Quality Class Identifier
TCP Transmission Control Protocol

REFERENCES

[1] WO2013085441 A1 "SCHEDULING OF DELAY-SENSITIVE TRAFFIC" Published 13 Jun. 2013.

The invention claimed is:

1. A method for pre-scheduling grant transmission, said method performed by a network node and comprising:
issuing a first sequence of pre-scheduling grants on a downlink to a User Equipment (UE), to provide said UE with reserved resources for uplink data packet transmission from a send buffer of said UE;
collecting data relating to transmitted uplink traffic initiated by said first sequence of pre-scheduling grants, to obtain a data set providing a statistical description of a traffic flow of the transmitted uplink traffic during a time period covered by said first sequence of pre-scheduling grants;
predicting, based on at least a subset of said obtained data set, a time when the next data packet will arrive at the UE send buffer; and
transmitting at least one pre-scheduling grant to the UE at a time in the vicinity of the predicted arrival time, to thereby provide the UE with timely resources for transmitting the next data packet after the next data packet arrives at the UE send buffer.

2. The method according to claim 1, wherein issuing said first sequence of pre-scheduling grants comprises transmitting pre-scheduling grants periodically with a period of at least one millisecond during a length of a specified time window.

3. The method according to claim 1, wherein collecting data comprises collecting data relating to receiving times at the network node for data packets transmitted on an uplink using said first sequence of pre-scheduling grants, and wherein said data set comprises a representation of a statistical description of the data packet receiving times.

4. The method according to claim 3, wherein collecting data comprises transforming said statistical description of the data packet receiving times to a statistical description of arrival times associated with the data packet receiving times, for data packets at the UE send buffer, by shifting the data packet receiving times with specified time amounts, whereby said data set comprises a statistical description of the arrival times of the data packets at the UE send buffer.

5. The method according to claim 4, wherein said transforming is performed on the statistical description of the data packet receiving times, by shifting said data packet receiving times with a time amount corresponding to a time the UE needs to process a pre-scheduling grant.

6. The method according to claim 1, wherein said collecting data further comprises collecting data relating to receiving times at the network node for scheduling requests transmitted from said UE on an uplink, and wherein said data set comprises a representation of a statistical description of the scheduling request receiving times.

7. The method according to claim 6, wherein collecting data comprises transforming said statistical description of the scheduling request receiving times to a statistical description of arrival times associated with the scheduling request receiving times, by shifting the scheduling request receiving times with a time amount corresponding to a time related to a length of an interval during which a UE is allowed to transmit a scheduling request.

8. The method according to claim 1, wherein predicting the time when the next data packet will arrive at the UE send buffer is performed by a prediction engine provided with said data set.

9. The method according to claim 8, wherein said prediction engine provided with said data set is a neural network adapted to find patterns within said obtained data set and use said patterns to predict the arrival time of the next data packet at the UE send buffer.

10. The method according to claim 1, wherein transmitting said at least one pre-scheduling grant comprises transmitting a number of pre-scheduling grants distributed around said predicted arrival time to thereby provide the UE with a set of pre-scheduling grants that allows the UE to pick a specific one of the set of pre-scheduling grants that is provided closest to the actual arrival time of the next data packet at the UE send buffer.

11. The method according to claim 10, wherein the number of the distributed pre-scheduling grants is determined based on a number of received scheduling requests.

12. The method according to claim 11, wherein the number of distributed pre-scheduling grants is determined based on threshold values, an upper threshold value indicating that a specified higher number of pre-scheduling grants are to be transmitted, and a lower threshold value indicating that a specified lower number of pre-scheduling grants are to be transmitted.

13. The method according to claim 1, wherein said steps are repeated using said at least one transmitted pre-scheduling grant in place of said first sequence of pre-scheduling grants to dynamically improve said obtained data set and enable the network node to collect more data to incorporate into said data set used for the predicted arrival time.

14. The method according to claim 1, wherein said network node is a radio base station.

15. A network node configured for pre-scheduling grant transmission, the network node comprising:
   transmitting circuitry configured to issue a first sequence of pre-scheduling grants on a downlink to a User Equipment (UE), providing said UE with reserved resources for uplink data packet transmission from a send buffer of said UE;
   data collecting circuitry configured to collect data relating to transmitted uplink traffic initiated by said first sequence of pre-scheduling grants in order to obtain a data set providing a statistical description of a traffic flow of the transmitted uplink traffic during a time period covered by said first sequence of pre-scheduling grants;
   processing circuitry operative as a prediction engine configured to predict, based on at least a subset of said obtained data set, a time when the next data packet will arrive at the UE send buffer; and wherein said
   transmitting circuitry is also configured to transmit at least one pre-scheduling grant to the UE at a time in the vicinity of the predicted arrival time, to thereby provide the UE with timely resources for transmitting the next data packet after the next data packet arrives at the UE send buffer.

16. The network node according to claim 15, wherein said transmitting circuitry is configured to issue the first sequence of pre-scheduling grants by periodically transmitting pre-scheduling grants with a period of at least one millisecond during a length of a specified time window.

17. The network node according to claim 15, wherein said data collecting circuitry is configured to collect data relating to receiving times at the network node for data packets transmitted on an uplink using said first sequence of pre-scheduling grants, and wherein said data set comprises a representation of a statistical description of the data packet receiving times.

18. The network node according to claim 17, wherein said data collecting circuitry is configured to transform said statistical description of the data packet receiving times to a statistical description of arrival times associated with the data packet receiving times, for data packets at the UE send buffer, by shifting the data packet receiving times with specified time amounts, whereby said data set comprises a statistical description of the arrival times of the data packets at the UE send buffer.

19. The network node according to claim 17, wherein said data collecting circuitry is configured to transform said statistical description of the data packet receiving times, by shifting the data packet receiving times with a time amount corresponding to a time that the UE needs to process a pre-scheduling grant.

20. The network node according to claim 15, wherein said data collecting circuitry is configured to collect data relating to receiving times at the network node for scheduling requests transmitted from said UE on an uplink, and wherein said data set comprises a representation of a statistical description of the scheduling request receiving times.

21. The network node according to claim 20, wherein said data collecting circuitry is configured to transform said statistical description of the scheduling request receiving times to a statistical description of arrival times associated with the scheduling request receiving times, by shifting the scheduling request receiving times with a time amount corresponding to a time related to a length of an interval during which a UE is allowed to transmit a scheduling request.

22. The network node according to claim 15, wherein said processing circuitry operative as a prediction engine is configured to predict the time when the next data packet will arrive at the UE send buffer based on said obtained data set.

23. The network node according to claim 22, wherein said prediction engine is a neural network adapted to find patterns within said obtained data set and use said patterns to predict the arrival time for the next data packet to the UE send buffer.

24. The network node according to claim 15, wherein said transmitting circuitry is configured to transmit a number of pre-scheduling grants distributed around said predicted arrival time to thereby provide the UE with a set of pre-scheduling grants that allows the UE to pick a specific one of the set of pre-scheduling grants that is provided closest to the actual arrival time for the next data packet at the UE send buffer.

25. The network node according to claim 24, wherein the number of the distributed pre-scheduling grants is determined based on a number of received scheduling requests.

26. The network node according to claim 25, wherein the number of the distributed pre-scheduling grants is determined based on threshold values, an upper threshold value indicating that a specified higher number of pre-scheduling grants are to be transmitted, and a lower threshold value indicating that a specified lower number of pre-scheduling grants are to be transmitted.

27. The network node according to claim 15, wherein said transmitting circuitry, data collecting circuitry and processing circuitry are configured to repeat their respective tasks using said at least one transmitted pre-scheduling grant in place of said first sequence of pre-scheduling grants to dynamically improve said obtained data set and enable the network node to collect more data to incorporate into said data set used for the predicted arrival time.

28. The network node according to claim 16, wherein said network node is a radio base station.

29. A non-transitory computer-readable storage medium storing a computer program comprising program instructions that, when executed by at least one processor of a network node, cause the network node to:
   issue a first sequence of pre-scheduling grants on a downlink to a User Equipment (UE), providing said UE with reserved resources for uplink data packet transmission from a send buffer of said UE;
   collect data relating to transmitted uplink traffic initiated by said first sequence of pre-scheduling grants in order to obtain a data set providing a statistical description of a traffic flow of the transmitted uplink traffic during a time period covered by said first sequence of pre-scheduling grants;
   predict, based on at least a subset of said obtained data set, a time when the next data packet will arrive at the UE send buffer; and
   transmit at least one pre-scheduling grant to the UE at a time in the vicinity of the predicted arrival time, to thereby provide the UE with timely resources for transmitting the next data packet after the next data packet arrives at the UE send buffer.

* * * * *